United States Patent Office 3,484,419
Patented Dec. 16, 1969

3,484,419
ACRYLONITRILE COPOLYMERS CONTAINING SULFONYLOXAMINO GROUPS
Heinrich Rinkler, Dormagen, Francis Bentz, Cologne, and Gunther Nischk, Dormagen, Germany, assignors to Farbenfabriken Bayer Aktiengesellschaft, Leverkusen, Germany, a corporation of Germany
No Drawing. Filed Aug. 22, 1967, Ser. No. 662,307
Claims priority, application Germany, Aug. 29, 1966, F 50,066
Int. Cl. C08f 3/92, 15/00
U.S. Cl. 260—79.3            12 Claims

ABSTRACT OF THE DISCLOSURE

Acrylonitrile copolymers are produced by copolymerisation of at least 50% by weight of acrylonitrile and from 0.1 to 20% of an ethylenically unsaturated sulfonyloxamino compound containing the characteristic group —SO$_2$—NH—CO—CO—, the balance being one or more additional copolymerisable monomers, said copolymerisation being carried out in an aqueous medium in the presence of a redox catalyst system or in an organic polar solvent in the presence of a radical catalyst. The acrylonitrile copolymers show an improved affinity for basic dyes and high thermal stability.

---

This invention relates to acrylonitrile polymers containing sulfonyloxamino groups and to a process for their production by copolymerising acrylonitrile with unsaturated compounds containing sulfonyloxamino groups, said acrylonitrile copolymers showing a high affinity for basic dyes.

The affinity for dyes of filaments and yarns made from acrylonitrile homopolymers and copolymers with neutral comonomers is not sufficient to meet practical requirements. Accordingly, it is difficult to dye them in sufficiently deep shades with basic or acidic dyes. The reason for this lies in the complete or partial absence of dye-receptive groups from the polymer. In order to overcome these difficulties several proposals have already been put forward for modifying acrylonitrile polymers.

It has already been proposed to copolymerise acrylonitrile with basic comonomers, for example, vinyl pyridine and derivatives thereof. Thus, although it was possible in this way to increase the affinity of the resulting textile products for acidic dyes, this improvement could only be obtained at the expense of other properties such as natural colour, thermal stability and affinity for basic dyes.

To improve dyeability with basic dyes, copolymers were prepared from comonomers containing carboxyl groups, such as acrylic acid, methacrylic acid or itaconic acid. Unfortunately, polymers such as these show a very marked tendency to discolour at elevated temperatures.

Although it is possible by including comonomers containing sulpho groups in the polymer to improve receptivity to basic dyes, the conventional methods of doing this are in many respects unsatisfactory from the technical point of view. Sodium methallyl- and allyl sulphonates can only be copolymerised with acrylonitrile in poor yields and only a fraction of the comonomers used can be incorporated in the polymer. This defect is also encountered in the copolymerisation of acrylonitrile with N-monosubstituted acrylamide derivatives containing sulpho groups, such as N-acryloyltaurine of N-acryloyl-p-aminophenyl-methane sulphonic acid. Although other known comonomers containing sulpho groups, for example, vinyl sulphonic acid, vinylbenzene sulphonic acid and their salts, can be copolymerised in aqueous medium, they are difficult to use in solution polymerisation because of their limited solubility in the organic solvents conventionally employed. In solution polymerisation, where polymerisation is carried out in a solvent in which the polymer formed is soluble, the starting materials and in particular the comonomers used have to be readily soluble in the reaction medium. If this is not the case, the comonomers cannot be statistically incorporated into the macromolecule, as they should be, while at the same time the tendency of the resulting solutions towards gel-formation is increased due both to the presence of undissolved particles and to salt depositions, with the result that the solutions become extremely difficult to spin.

It is an object of this invention to provide acrylonitrile copolymers containing sulfonyloxamino groups with the characteristic grouping —SO$_2$—NH—CO—CO—. The acrylonitrile copolymer comprises at least 50% by weight of copolymerised acrylonitrile and 0.1 to 20% by weight of an ethylenically unsaturated sulfonyloxamino-compound containing the characteristic group

—SO$_2$—NH—CO—CO— the balance being one or more additional copolymerisable monomers.

It has been found that acrylonitrile copolymers which have an acrylonitrile content of at least 50% by weight and show an improved affinity for basic dyes and high thermal stability, connected with a limited tendency to gel in concentrated solution, can be obtained by a process in which acrylonitrile is copolymerised together with 0.1 to 20% by weight of an unsaturated sulfonyloxamino compound or salt thereof obtained by substituting an alkali metal for the acid H-atom, in the presence of a radical-forming catalyst and optionally in the presence of at least one additional comonomer.

The unsaturated sulfonyloxamino compounds contain the characteristic group

—SO$_2$—NH—CO—CO—

Examples of monomers which may be used as unsaturated sulfonyloxamino compounds are the following:

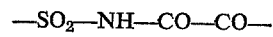

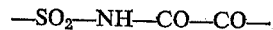

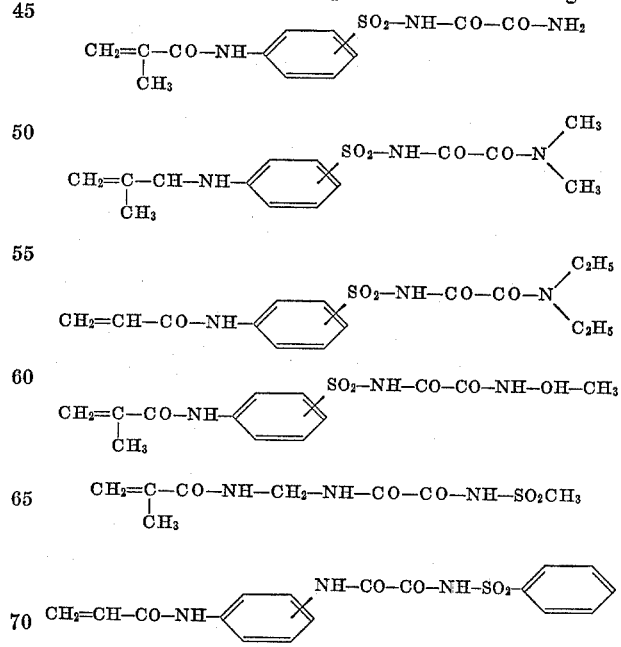

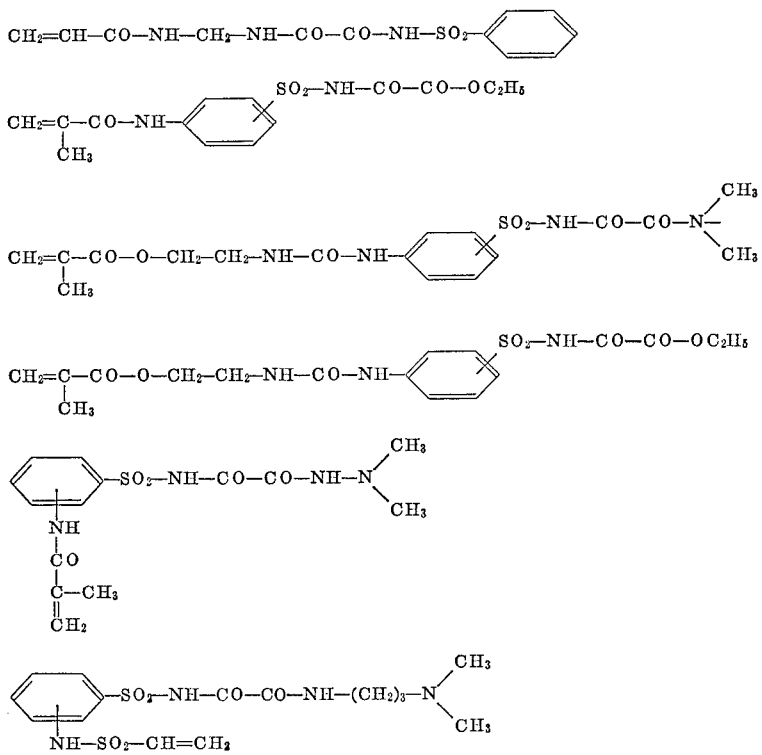

The sulfonyloxamino compounds may be prepared by methods known from the literature from the alkali metal salts of sulf-onamides and the half esters of oxalic acid derivatives in the presence of sodium methoxide.

The quantity in which it is desired to incorporate the sulfonyl-oxamino compounds into the acrylonitrile polymer, is governed largely by the purpose for which the polymers are to be used and also inter alia by the type of polymerisation and by the type of catalyst used. In cases where polymerization is carried out in aqueous medium catalyst systems (for example persulfate/bisulfite) which give terminal groups which are reactive with cationic dyes, will generally be used. If it is intended to use the copolymers for the production of filaments and fibres, it is usually sufficient for this purpose to use only 0.5 to 1.0% by weight of the comonomer containing sulfonyloxamino groups for polymerization in aqueous medium in order to obtain the level of dyeability normally required for practical purposes. In order to obtain special effects, for example a marked improvement either in the hydrophilic properties or in the swelling capacity of the polymers, the comonomers containing sulfonyloxamino groups may be included in the polymer in quantities of 4 to 8% by weight.

In the solution polymerization of acrylonitrile in organic solvents, for example dimethyl formamide, dimethyl acetamide, dimethyl sulfoxide or ethylene glycol carbonate, it is usually necessary to use more of the comonomer containing sulfonyloxamino groups than is required for aqueous polymerization in order to obtain the same level of dyeability. In this instance, all acid groups must be introduced by copolymerization, as the preferably used catalysts give neutral terminal groups. The preferred quantity of comonomers containing sulfonyloxamino groups is usually from 2 to 4% by weight, based on the total amount of monomer. One particular advantage of the process is that the comonomers containing sulfonyloxamino groups are readily soluble in the aforementioned solvents, even in this relatively high concentration, and as a result make it possible to prepare satisfactory spinning solutions, even by solution polymerization in organic solvents.

Acrylonitrile is preferably copolymerized with the comonomer containing sulfonyloxamino groups in the presence of one or more other copolymerisable unsaturated compounds. Compounds of this kind include inter alia acrylates and methacrylates, vinyl esters, styrene and its neutral derivatives, vinyl chloride, vinylidene chloride, vinyl bromide, butadiene, chloroprene, acrylamide, methacrylamide, vinyl alkyl ketones, vinylidene cyanide or divinyl compounds, an well as basic comonomers, for example, vinyl pyridine and its derivatives.

The solubility of the polymers can be substantially improved and the dyeability of the resulting fibres further increased by including in the polymer a third comonomer for example methy acrylate, methyl methacrylate or vinyl acetate. The quantity in which these comonomers are present in the polymer may be from 2 to 10% by weight and is preferably from 5 to 7% by weight.

If it is desired to provide readily-dyeable polyacrylic fibres with specific properties, the additional comonomers will generally be used in a fairly large proportion relative to the acrylonitrile. If acrylonitrile is copolymerised with 1 to 3% by weight of the comonomers containing sulfonyloxamino groups and, for example, with 25 to 45% by weight of vinylidene chloride, it is possible to obtain highly soluble polymers and highly concentrated spinning solutions while at the same time the fibres spun from these solutions show greatly reduced flammability in addition to their high affinity for dyes and thermal stability.

Acrylonitrile may be copolymerised with the comonomers by conventional methods of polymerization, for example in aqueous emulsion, dispersion or in solution. In emulsion polymerization, conventional emulsifiers such as salts of fatty acids, alkyl or aryl sulfonates, and non-ionic emulsifiers may be used. When comonomers sparingly soluble in water, for example vinylidene chloride, are used, solution promoters, for example lower alcohols may be used in dispersion polymerization. Solution polymerization may be carried out in aqueous concentrated salt solutions, for example, zinc or calcium chloride solutions or solutions of inorganic thiocyanates, and in organic solvents such as dimethyl formamide, dimethyl acetamide, dimethyl sulfoxide, ethylene glycol carbonate or butyrolactone.

Polymerization in aqueous medium is preferably carried out in the absence of emulsifiers using water-soluble radical-forming catalysts or catalyst systems, such as inorganic or organic peroxide compounds and compounds of sulfur in low oxidation stages. The water-soluble salts of peroxy-disulfuric acid, for example, potassium, sodium or ammonium persulfate, are preferably used as the peroxidic compounds in the redox system. Sulfur dioxide, alkali metal hydrosulfites, alkali metal pyrosulfites and alkali metal thiosulfites are extremely effective reduction components. Of these, sodium or potassium hydrogen sulfite or pyrosulfite are preferably used. The catalysts are used in quantities from 0.5 to 5% by weight, based on the total weight of the monomers. The ratio between oxidising and reducing agent in the redox system can be from 2:1 to 1:50 and is preferably from 1:2 to 1:10. In order further to activate the catalyst system, relatively small qunatities of salts containing heavy-metal ions, such as those of copper and iron may be added. Suitable neutral salts such as alkali metal or alkaline earth metal sulfates or phosphates, may also be present in the polymerization mixture. Other additives such as regulators, for example mercaptans, or complex-formers, for example metaphosphoric acid, oxalic acid, ethylene diamine tetracetic acid or their salts, may also be used. In this case, polymerization is carried out by the conventional continuous-cycle or batch processes. The desalted water used is employed in a quantity 5 to 10 times larger than that in which the monomers are used. The reaction temperature may be from 10 to 70° C. and is preferably from 40 to 55° C. The pH-value of the reaction mixture is conveniently from 2 to 6 and is preferably from 2.5 to 4 Concentrated inorganic or organic acids, preferably sulfuric acid, are used to adjust the pH-value. It is often of advantage to carry out polymerization in an inert gas atmosphere (for example nitrogen). After the reaction has been stopped, optionally by the addition of inhibitors or complex-formers or by neutralising the reaction mixture, the copolymers obtained in a fine granular form are separated from the liquid phase by filtration or centrifuging, are washed with desalted water and dried at reduced pressure or in a stream of heated air.

When solution polymerization is carried out in organic solvents, the quantitative ratio between monomer and solvent in the reaction mixture is variable within wide limits, irrespective both of the solvent and of the further comonomers used, and their ratio to the acrylonitrile. If acrylonitrile is copolymerised in dimethyl formamide with only the comonomers containing sulfonyloxamino groups, the monomer concentration has to be kept below 25% by weight, if clear, non-gelling solutions are to be obtained. When copolymerization is carried out in the additional presence of, for example, 5 to 8% by weight of methyl acrylate or vinyl acetate, the initial monomer concentration may be as much as 40% by weight, although it is preferably from 25% to 35% by weight, without any danger of the solution gelling or clouding during or after completion of polymerization. In the terpolymerization of acrylonitrile with approximately 25 to 45% of vinylidene chloride, the concentration of the monomers in dimethyl formamide may with advantage be from 30 to 60% by weight. Due to the poorer solubility of the monomers in dimethyl acetamide, ethylene carbonate and dimethyl sulfoxide, the limits to their initial concentration in these solvents are approximately 5% to 10% by weight lower than in dimethyl formamide.

Radical-forming catalyst systems soluble in the solvents used may be employed to initiate polymerization. Examples of such catalysts include azo compounds such as azoisobutyronitrile, inorganic peroxides such as ammonium persulfate, organic hydroperoxides, ketone peroxides, acyl peroxides or peroxyesters. Redox systems which are also effective at relatively low temperatures, are preferably used. Systems of this kind may comprise the aforementioned organic peroxides in conjunction with reducing compounds, for example, sulfinic acid derivatives. Effective reducing components based on sulfinic acid include alkali metal or amine salts of sulfinic acids, sulfinic acid esters and amides as well as α-aminosulfones or formamidine sulfinic acid. With redox systems of this kind, the presenc eof a concentrated acid, for example sulfuric acid or an aromatic sulfonic acid, is advantageous and sometimes necessary. Some of the aforementioned sulfinic acid derivatives, for example their salts and amides, are effective polymerization catalysts in the presence of concentrated acids, even without peroxides.

The reaction mixture usually contains up to 3% by weight of the aforementioned catalysts. In the case of redox systems the molar ratio between peroxide and sulfinic acid derivative is from 1:0.2 to 1:4. The acid may be used in as high as a fourfold molar excess relative to the sulfinic acid derivative.

The presence of small quantities of water in the solution is usually of advantage. When dimethyl sulfoxide or ethylene carbonate is used as the solvent, the water content can be from 10 to 15% by weight.

The polymerization temperature is variable within a wide range from 0 to 100° C. irrespective of the type of catalyst and solvent used, although polymerization is preferably carried out at a temperature from 25 to 60° C. After the desired conversion or solution concentration has been reached, polymerization is stopped by the addition of a conventional inhibitor. Thereafter, the solution may be dry-spun or wet-spun by known methods either directly or following removal of any unreacted monomers, for example in a falling-film evaporator at reduced pressure. The spinning solutions thus obtained are either colourless or show only a slight yellowish tinge, and are clear and gel-free so that they can be further processed without any difficulty at all. Following removal of any unreacted monomers, they can be stored for prolonged periods without any appreciable change in their viscosity.

It has been found that, by virtue of their acid groups, the sulfonyloxamino compounds give the polymers a much higher affinity for dyes and better hydrophilic properties than the known sulfonylcarbonylimides.

The copolymers with sulfonylamino compounds have a high degree of whiteness. The polymers and the solutions prepared from them show a high thermal stability.

The polymers obtained by aqueous precipitation polymerization can also be processed by suitable solution processes to form a clear, gel-free spinning solution which can be spun without any difficulty.

The percentages given in the specification and in the following examples, which are further to illustrate the invention without limiting it, are percentages by weight, based on the total quantity, unless otherwise stated.

Example 1

A reaction mixture containing 130 g. of dimethyl formamide, 64.3 g. of acrylonitrile, 4.2 g. of methyl acrylate, 1.5 g. of the compound

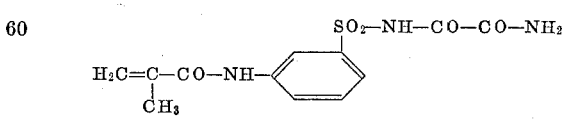

1.2 g. of water, 0.46 g. of mono-tert.-butyl permaleate (50% by weight paste in dimethyl phthalate), 0.32 g. of benzene sulfinic acid amide and 0.4 g. of concentrated sulfuric acid, was stirred at 40° C. under a nitrogen atmosphere in a 250 ml.-capacity three-necked flask. After a reaction time of 12 hours, a clear, pale-yellow viscous solution was formed. The yield was determined by precipitation from a mixture of water and methanol (3:1). It was 73.5%, the K-value of the polymer being 78.2 (according to Fikentscher, Cellulosechemie 13, page 58, 1932).

Example 2

A reaction mixture containing 260 g. of dimethyl formamide, 125.6 g. of acrylonitrile, 8.4 g. of methyl acrylate, 6 g. of the compound

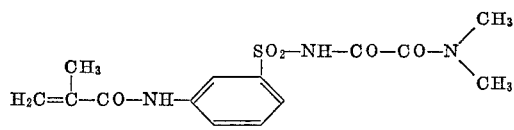

2.4 g. of water, 0.92 g. of mono-tert.-butyl permaleate (50% paste in dimethyl phthalate), 0.64 g. of benzene sulfinic acid amide and 0.7 g. of concentrated sulfuric acid, was stirred at 40° C. under a nitrogen atmosphere in a 500 ml.-capacity three-necked flask. After a reaction time of 12 hours, a clear pale yellow viscous solution was formed. The yield was determined by precipitation with a mixture of water and methanol (3:1). It was 75.1%, the K-value of the polymer being 79.3.

In order to test the tendency to discolouration of the copolymers, they were heated in 5% by weight solution in dimethyl formamide at 80° C. in the presence of air. The extinction coefficients of the solutions were measured after 2, 3 and 20 hours by means of an electrophotometer (type BFK photometer DS1, manufactured by Messrs. Kipp & Zonen) at a wave length of 312 m$\mu$ (cell length=1 cm., comparison solution=pure dimethyl formamide). An acrylonitrile homopolymer prepared in accordance with Example 1 (K-value 86), was used for comparison. The measurements taken are set out in the following table.

TABLE I

| | Extinction coefficients at 312 m$\mu$ after— | | |
|---|---|---|---|
| | 2 hours | 3 hours | 20 hours |
| Polymer from Example No.: | | | |
| 1 | 0.690 | 0.710 | 0.862 |
| 2 | 0.545 | 0.640 | 0.820 |
| Comparison | 0.770 | 0.850 | 0.960 |

The sulfonyloxamino groups incorporated in the polymer were detected as follows by potentiometric titration in dimethyl formamide solution:

1 g. of polymer was dissolved in 100 ml. of distilled dimethyl formamide treated with a mixed-bed ion-exchanger (Merck type 5). Thereafter 5 cc. of the mixed-bed ion-exchanger was introduced into the solution which was then stirred for from 30 minutes to one hour. The solution was then filtered, 50 cc. being titrated with an N/100 KOH-solution. A Knick pH-meter (type 52, calomel glass electrode) was used as the measuring instrument. The measurements are given in milliequivalents of acid groups per 100 g. of polymer in Table II below.

The improved affinity of the aforementioned copolymers for basic dyes can be demonstrated very easily by dyeing films. For this purpose, films were cast from approximately 15% by weight dimethyl formamide solutions in a layer thickness of approximately 50$\mu$. After drying in vacuo for 24 hours at 60° C., the films were washed free from solvent with hot water and then dried. The films thus obtained were dyed as follows with basic dye Astrazonblau B (Color Index 2nd edition, vol. III, No. 42140): Composition of the dye bath:

100 ml. of Astrazonblau-B-solution (1 g./l.)
2 ml. of acetic acid (30 g./l.)
0.3 ml. of sodium acetate (40 g./l.)

The dye was dissolved in boiling water, filtered and measured off while still hot. Approximately 0.5 to 1 g. of film was added at a dye bath temperature of 80° C., and dyed for 1 hour after the boiling temperature had been reached. The dyed films were thoroughly washed with water and dried.

In order quantitatively to determine the amount of dye absorbed, the dyed films were carefully dissolved in dimethyl formamide containing 1 g./litre of sulfuric acid.

Determination was effected by measuring the extinction coefficients at a wave length of 620 m$\mu$ (adsorption maximum of the dye) with the above-described photometer and a calibration curve (extinction—g./l. of dye). The measurements are set out in the following Table II (g. dye/g. film):

TABLE II

| | mVals. of acid groups 1,000 g. of PM | g. of dye/ g. of film |
|---|---|---|
| Polymer from Example No.: | | |
| 1 | 55.3 | 0.65·10⁻² |
| 2 | 92.2 | 1.10·10⁻² |
| Comparison | 7.2 | 0.12·10⁻² |

Example 3

A reaction mixture, containing 65 g. of dimethyl formamide, 42.4 g. of acrylonitrile, 2.1 g. of methyl acrylate, 0.5 g. of the compound

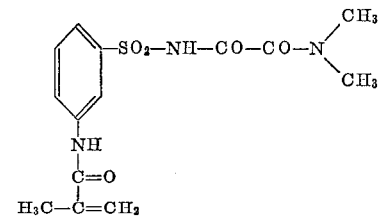

0.6 g. of water, 0.23 g. of mono-tert.-butyl permaleate (50% by weight paste in dimethyl phthalate), 0.16 g. of benzene sulfinic acid amide and 0.2 g. of concentrated sulfuric acid, was introduced into a 100 ml.-capacity long-necked flask provided with a ground-glass joint. The vessel was then sealed and heated in a water bath at 35° C. After a reaction time of 12 hours, a clear pale yellow viscous solution was formed. The yield was determined by precipitation with a mixture of water and methanol (3:1). It was 71%, the K-value of the polymer being 77.5. The sulfonyloxamino groups in the polymer were again determined by titration as described above. There were 61 mVals. of acid groups per 1,000 g. of polymer. The films prepared from the copolymer could be dyed in deep shades with basic Astrazon dyes. A film treated for 1 hour at 160° C. in a recirculation drying cabinet was pale yellow. By contrast, a film prepared under the same conditions from an acrylonitrile homopolymer for comparison in the heat-treatment test, discoloured much more noticeably.

Example 4

The polymerization reaction was carried out under a nitrogen atmosphere at 35° C. in a pressure-resistant sealed glass vessel. The reaction mixture contained 55 g. of dimethyl formamide, 28.9 g. of acrylonitrile, 16.1 g. of vinylidene chloride, 1.0 g. of the compound

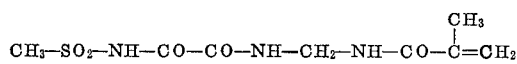

0.3 g. of mono-tert.-butyl permaleate, 0.2 of p-toluene sulfinic acid amide, 0.15 g. of concentrated sulfuric acid and 0.8 ml. of water. The reaction was stopped after 22 hours. The viscous solution formed was clear and almost colourless and had a polymer concentration of 32.9% by weight (yield 73.2%). A film prepared from the solution absorbed 1.06·10⁻² Astrazonblau-B-dye/g. of film from the dye bath (see above for dyeing procedure and the method used to determine the amount of dye absorbed). By contrast, a copolymer of the same composition, but without the compound of the formula given, absorbed hardly any dye.

Example 5

11.2 parts of weight of the compound of the formula

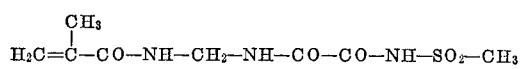

are dissolved in 1,860 parts by weight of desalted water. 128.8 parts by wieght of acrylonitrile are added at 50° C. and polymerization is started by adding the catalyst system consisting of 1.0 part by weight of potassium persulfate and 4.0 parts by weight of sodium meta bisulfite. After a 4 to 5 hours polymerization at 55–60° C. the resulting polymerizate is filtered off by suction, carefully washed with hot water and dried. The yield is 123 parts by weight, i.e. 88% of the theoretical amount, the K-value of the polymer being 90.

A sample of the polymerizate was dissolved in dimethylformamide and titrated with $n/10$ KOH. There were found 315 mVal. acid groups per 1,000 g. of the polymerizate. A film cast from a dimethylformamide solution was dyed with Astrazonblau-B as described in Example 2. $4.1 \cdot 10^{-2}$ g. dye/g. of film were absorbed.

Example 6

The reaction mixture consisting of 260 parts by weight of dimethylformamide, 128.8 parts by weight of acrylonitrile, 7 parts by weight of methylacrylate and 4.2 parts by weight of the compound of the formula

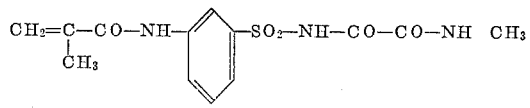

is polymerised during 18 hours at 35° C. with 1.2 parts by weight of p-toluene-sulfinamide, 2.0 parts by weight of mono-tert.-butylpermaleate (as a 50% by weight paste in dimethylphthalate) and 1.2 parts by weight of concentrated sulfuric acid. Thereafter the solution of the polymerizate is diluted by 300 parts by weight of dimethylformamide and precipitated in water with intensive stirring.

The yield is 118 parts by weight, i.e. 84% of the theoretical amount, the K-value of the polymer being 82. A film cast from the solution of the polymer absorbed $1.5 \cdot 10^{-2}$ g. Astrazonblau-B-dyestuff/g. of film.

What we claim is:

1. An acrylonitrile copolymer comprising at least 50% by weight of copolymerised acrylonitrile and from 0.1 to 20% by weight of an ethylenically unsaturated sulfonyloxamino compound containing the characteristic group —$SO_2$—NH—CO—CO—, the balance being one or more additional copolymerisable monomers.

2. The acrylonitrile copolymer of claim 1, wherein said ethylenically unsaturated sulfonyloxamino compound is the compound of the formula

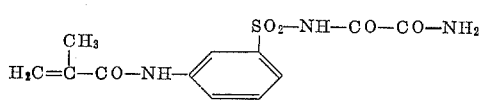

3. The acrylonitrile copolymer of claim 1, wherein said ethylenically unsaturated sulfonyloxamino compound is the compound of the formula

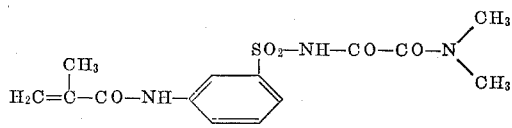

4. The acrylonitrile copolymer of claim 1, wherein said ethylenically unsaturated sulfonyloxamino compound is the compound of the formula

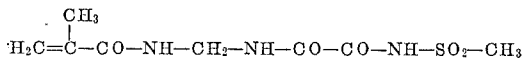

5. The acrylonitrile copolymer of claim 1, wherein said ethylenically unsaturated sulfonyloxamino compound is the compound of the formula

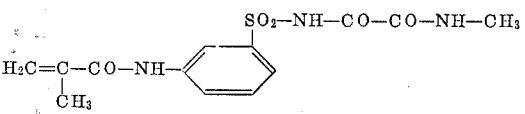

6. The acrylonitrile copolymer of claim 1, wherein said additional copolymerizable monomer is vinylidenechloride.

7. The acrylonitrile copolymer of claim 1, wherein said additional copolymerizable monomer is methylacrylate.

8. The acrylonitrile copolymer of claim 1, wherein said additional copolymerizable monomer is vinylidenechloride.

9. A process for the production of acrylonitrile copolymers containing at least 50% by weight of copolymerised acrylonitrile which comprises copolymerising acrylonitrile with 0.1 to 20% by weight of an ethylenically unsaturated sulfonyloxamino compound, containing the characteristic group —$SO_2$—NH—CO—CO—, the balance being one or more additional copolymerizable monomers, said copolymerization being carried out in the presence of a radical forming catalyst in a liquid medium.

10. The process of claim 9, wherein said copolymerizing is carried out in an aqueous medium at a pH-value from 6 to 2 in the presence of a redox catalyst system consisting of a persulfate and a bisulfite compound.

11. The process of claim 9, wherein said copolymerizing is carried out in an organic polar solvent in the presence of a radical catalyst which is soluble in the reaction medium.

12. The process of claim 11, wherein said organic polar solvent is dimethylformamide.

References Cited

UNITED STATES PATENTS

| | | | |
|---|---|---|---|
| 2,496,275 | 2/1950 | Dickey. | |
| 2,566,162 | 8/1951 | Caldwell | 260—79.3 |
| 2,723,254 | 11/1955 | Chaney | 260—79.3 |
| 3,351,618 | 11/1967 | Toepfl et al. | 260—78.5 |

JAMES A. SEIDLECK, Primary Examiner

U.S. Cl. XR.

8—55; 260—63, 78.5

PO-1050
(5/69)

UNITED STATES PATENT OFFICE
CERTIFICATE OF CORRECTION

Patent No. 3,484,419　　　　Dated December 16, 1969

Inventor(s) HEINRICH RINKLER, FRANCIS BENTZ AND GUNTHER NISCHK

It is certified that error appears in the above-identified patent and that said Letters Patent are hereby corrected as shown below:

Column 4, line 45, "methy " should be --methyl-- .

Column 5, line 18, "qunatities" should be --quantities--.

Column 8, line 17, "42.4" should be --32.4--.

Column 9, line 65 "NH CH$_3$" should be --NH-CH$_3$--.

Column 10, Claim 6, Lines 61-62, "vinylidene-chloride" should be --methylmethacrylate--.

SIGNED AND
SEALED
JUL 28 1970

(SEAL)
Attest:

Edward M. Fletcher, Jr.
Attesting Officer

WILLIAM E. SCHUYLER, JR.
Commissioner of Patents